United States Patent [19]

Scheffler et al.

[11] 4,203,963
[45] May 20, 1980

[54] STAGED VAPORIZATION OF LIQUID HYDROCARBON FUELS

[75] Inventors: Glenn W. Scheffler, Tolland; Yasar Tanrikut, Manchester, both of Conn.

[73] Assignee: United Technologies Corporation, Hartford, Conn.

[21] Appl. No.: 859,381

[22] Filed: Dec. 12, 1977

[51] Int. Cl.² .............................................. C01B 1/13
[52] U.S. Cl. ................................ 423/650; 48/197 R; 48/213; 48/214 R; 123/133; 208/48 R; 252/373; 261/128; 261/149; 429/20; 431/11; 431/211
[58] Field of Search ............... 48/93, 94, 96, 180 R, 48/213, 214 R, 197 R, 214 A, 215, 211, 212; 261/20, 128, 149, 141; 165/144; 123/198 A, 25 P, 3, 121, 127, 133, 122 B, 122 R, 122 AA, 25 B, 25 D; 208/48 R, 58, 102, 107, 143; 429/17, 20; 431/211, 212, 4, 11; 62/50, 51, 52; 423/650; 252/373

[56] References Cited
U.S. PATENT DOCUMENTS

| 2,937,131 | 5/1960 | Chellis | 208/48 R |
| 2,989,459 | 6/1961 | Eastman et al. | 208/102 |
| 3,148,135 | 9/1964 | Schlinger et al. | 208/58 |
| 3,216,924 | 11/1965 | McKinney et al. | 208/48 R |
| 3,224,959 | 12/1965 | Schlinger et al. | 208/107 |
| 3,354,075 | 11/1967 | Brodeur et al. | 208/58 |
| 3,362,903 | 1/1968 | Eastman et al. | 208/143 |
| 3,369,994 | 2/1968 | Slater et al. | 208/58 |
| 3,557,241 | 1/1971 | Kivlen et al. | 208/48 R |
| 3,713,794 | 1/1973 | Maher et al. | 261/141 |
| 3,904,744 | 9/1975 | Pagel | 48/197 R |
| 3,963,013 | 6/1976 | Authement et al. | 123/133 |

Primary Examiner—Kenneth M. Schor
Assistant Examiner—George C. Yeung

[57] ABSTRACT

A method for vaporization of liquid hydrocarbon fuel wherein liquid hydrocarbon fuel is mixed with vapor to provide a vapor product which is heated. The heated vapor product is mixed with additional liquid hydrocarbon fuel to provide a second vapor product comprising vaporized hydrocarbon fuel. The heating of vapor product and mixing of additional liquid hydrocarbon fuel can be done until a desired amount of liquid hydrocarbon fuel is vaporized.

17 Claims, 1 Drawing Figure

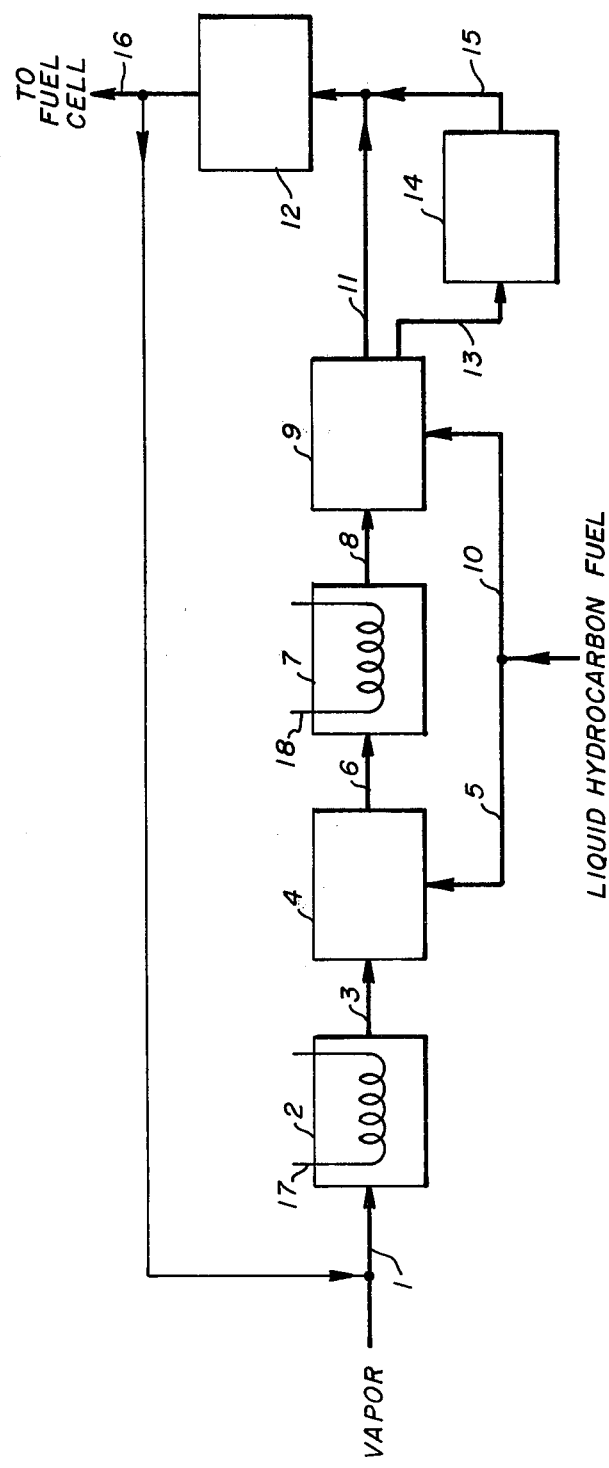

STAGED VAPORIZATION OF LIQUID HYDROCARBON FUELS

BACKGROUND OF THE INVENTION

1. Field of the Invention

The present invention relates to the vaporization of liquid hydrocarbon fuel for use in conventional steam reformers, thermal steam reformers, and advanced reformer concepts.

2. Description of the Prior Art

It is known to use hydrogen as a source of energy in fuel cells. One method of obtaining hydrogen fuel is by conventional steam reforming in which vaporized hydrocarbon fuel is reacted with steam in the presence of a catalyst to produce hydrogen (hydrocarbon + $H_2O$ + energy → $3H_2 + CO_2$). The liquid hydrocarbon fuel which is to be reacted must be introduced into the steam reforming reactor in vapor phase.

One method of vaporizing the liquid hydrocarbon fuel is to pass the liquid through a heat exchanger to vaporize the liquid before introducing it into the steam reformer. A disadvantage with this method is that hydrocarbon residue tends to bake and accumulate on heat exchanger walls, thus reducing heat exchanger efficiency and eventually clogging the heat exchanger.

One method of reducing hydrocarbon accumulation and clogging is to mix the liquid hydrocarbon fuel with a vapor prior to introduction into the steam reforming reactor. U.S. Pat. No. 3,698,957 discloses a method wherein steam from a heat exchanger is mixed with liquid hydrocarbon fuel to produce vapor which is injected into the reformer reactor. There are two drawbacks to this method. In order for the heat exchanger to heat water into steam having a sufficiently high energy content to vaporize the liquid hydrocarbon fuel, a high temperature energy source must be used in the heat exchanger. Also the liquid hydrocarbon fuel may contain significant amounts of sulfur, which may have to be removed from the fuel before it is introduced into the reformer reactor. A conventional desulfurizer is used for this purpose. However, the desulfurizer cannot tolerate significant amounts of oxygen, and therefore, steam cannot be used to vaporize the liquid fuel.

It is also known to use recycled hydrogen vapor from the reformer reactor to vaporize the liquid hydrocarbon fuel. The hydrogen vapor must be heated in a heat exchanger prior to mixing with the liquid hydrocarbon fuel. A disadvantage of this method is that the energy source used to heat the hydrogen vapor in the heat exchanger must have a relatively high temperature.

To summarize, the prior art method of vaporizing liquid hydrocarbon fuel is a one step process wherein the vapor to be mixed with the liquid hydrocarbon is heated in heat exchangers to temperatures in excess of 1000° F. In order to heat the vapor to such high temperatures, the heat exchanger must use a high temperature energy source, generally, vapor having a specific heat in the range from 0.2 to 1 Btu/lb°F. and having a temperature between about 1100° and 1200° F.

It is an object of the present invention to provide vaporized liquid hydrocarbon fuel without necessitating reliance on high temperature energy sources for the heat exchanger.

It is a further object of the present invention to provide a method of vaporization of liquid hydrocarbon fuels that reduces hydrocarbon accumulation on heat exchangers.

SUMMARY OF THE INVENTION

The present invention provides a method for vaporization of liquid hydrocarbon fuel wherein liquid hydrocarbon fuel is mixed with vapor to provide a first vapor product, the first vapor product is heated in a heat exchanger and then mixed with additional liquid hydrocarbon fuel to provide a second vapor product which may be used for additional vaporization stages or introduced in the reformer reactor or desulfurizer.

In one embodiment of the invention, the vapor comprising hydrogen, which is recycled from the steam reformer, is heated in a heat exchanger prior to mixing with liquid hydrocarbon fuel. The heat exchanger can use energy sources having relatively low energy content. The heated hydrogen vapor is then mixed with liquid hydrocarbon fuel to form a first vapor product. The first vapor product is then heated in a heat exchanger which may also use energy sources having relatively low energy content and is then mixed with additional liquid hydrocarbon fuel to provide a second vapor product which is ultimately introduced into a conventional reformer reactor.

BRIEF DESCRIPTION OF THE DRAWING

The FIGURE is a diagramatic flow plan of a two-stage vaporization system.

DETAILED DESCRIPTION OF THE INVENTION

The invention is described with reference to the FIGURE.

Vapor having a temperature between about 200° F. and about 600° F. is introduced into heat exchanger 2 wherein the vapor is heated to between about 300° F. and about 900° F. The heated vapor is delivered to mixer 4 through line 3 where the vapor is mixed with liquid hydrocarbon fuel which is delivered to mixer 4 through line 5. The mixing of the liquid hydrocarbon fuel and the vapor in mixer 4 allows for the vaporization of the liquid hydrocarbon fuel to produce a first vapor product having a temperature between about 200° F. and about 700° F.

The first vapor product from mixer 4 is delivered through line 6 to heat exchanger 7 wherein the first vapor product is heated to a temperature between about 300° F. and about 900° F. The first vapor product having an elevated temperature is delivered from heat exchanger 7 through line 8 to mixer 9 where it is mixed with additional liquid hydrocarbon fuel delivered through line 10 into mixer 9 to provide a second vapor product. The second vapor product may be delivered through line 11 to a conventional steam reforming reactor 12 wherein the second vapor product is reacted to form hydrogen vapor. However, if the liquid hydrocarbon fuel contains substantial quantities of sulfur, the second vapor product will be delivered through line 13 to a conventional desulfurizer 14 and then delivered through line 15 to steam reformer 12.

Steam reformer 12 produces a vapor comprising hydrogen. A portion of the hydrogen vapor is recycled and delivered through line 1 to heat exchanger 2. Another portion of the hydrogen vapor is removed from the system through line 16 to be used eventually as a fuel in a fuel cell.

The vapor can be any gas having heat transfer characteristics such that when the vapor is heated and mixed with liquid hydrocarbon fuel, the liquid hydrocarbon fuel is vaporized. It is preferred that the vapor have a relatively high specific heat. When the process of the present invention is used for steam reforming of hydrocarbon fuels, the specific heats of the vapors range from about 0.2 to about 1 Btu/lb°F., and particularly from about 0.5 to about 0.8 Btu/lb°F. In the preferred embodiment of the invention the vapor comprises at least about 50 volume percent hydrogen the remainder being carbon dioxide and steam. When the liquid hydrocarbon fuel does not include a substantial amount of sulfur or the reformer reactor is sulfur tolerant, the vapor can comprise as much as 100% water in the form of steam. The source of steam may be the same source of steam that is necessary to provide steam to the reforming reactor.

The liquid hydrocarbon fuel which is to be vaporized may be any type of liquid hydrocarbon fuel such as, for example, naphtha, gasoline, kerosene or oil. Mixtures of different types of liquid hydrocarbon fuels may be used. The preferred source of liquid hydrocarbon fuel for use in steam reforming is naphtha having an end boiling point between about 200° F. to about 400° F. The liquid fuel may be at room temperature when mixed with the vapor, although liquid fuels having temperatures in excess of room temperatures may also be used.

One advantage of the present invention is that heat exchangers 2 and 7 may use energy sources having relatively low energy content. Heat exchanger vapor having relatively low energy content is delivered to heat exchangers 2 and 7 through conduits 17 and 18. The heat exchanger vapor may be steam or recycled hydrogen gas from another part of the reformer reactor system. In the prior art wherein the liquid hydrocarbon fuel was vaporized in a single stage process, the vapor had to be heated to relatively high temperatures, that is temperatures in excess of about 1000° F., which required the heat exchanger to use energy sources having relatively high energy content, that is, vapors having specific heats in the range from about 0.2 to about 1 Btu/lb°F. and having temperatures in the range from about 1100° to 1200° F. With the present invention, which is at least a two-stage process, the heat exchangers may use sources having a relatively low energy content. Preferably, the heat exchangers may use vapor having specific heats in the range from about 0.2 to 1 Btu/lb°F. and having a temperature below about 1000° F., and even below about 750° F. Although the ability of the heat exchangers to elevate the temperature of the vapor to be mixed with the liquid hydrocarbon fuel is dependent on the efficiency of the heat exchangers, the mass flow of the heat exchange vapor through the heat exchanger and other parameters, it should be understood that, all other parameters remaining constant, the heat exchangers of the present invention require a lower temperature energy source than the prior known methods.

It is preferred that the vapor delivered through line 3 to mixer 4 have a temperature sufficient to vaporize the liquid hydrocarbon fuel delivered to mixer 4 through line 5. It is undesirable to have liquid hydrocarbon fuel remaining after mixing in mixer 4 because liquid hydrocarbon fuel may tend to clog heat exchanger 7. It is preferred to mix liquid hydrocarbon fuel and vapor of about 300° F. to about 900° F. in a weight ratio of fuel to vapor from about 0.1 to about 1.0.

The first vapor product which is delivered through line 6 to heat exchanger 7 is a mixture of vaporized hydrocarbon fuel and vapor. It is preferred that the first vapor product be heated by heat exchanger 7 to a temperature sufficient to vaporize the additional liquid hydrocarbon fuel which is delivered via line 10 to mixer 9. It is preferred that the first vapor product have a temperature after it has been heated in heat exchanger 7 between about 300° F. and 900° F. and that it be mixed with liquid hydrocarbon fuel in mixer 9 in a liquid fuel-to-first vapor product weight ratio from about 0.1 to about 0.5.

The heat exchangers described in connection with the present invention can be any conventional heat exchanger that provides for heat exchange between gases. The mixers described in the present invention can be any conventional mixer which will provide for the mixture of liquid hydrocarbon fuel with vapor to provide a vapor product. It is known to use a mixer which is simply a joinder of two conduits into one conduit. In the preferred type of mixer, after the liquid fuel in one conduit and the vapor in another conduit are delivered to a single conduit, the mixture is flowed into a chamber having obstructions therein which provide for mixing and vaporization.

Although the process of the present invention has been described as a two-stage process, the concept of staged vaporization of liquid hydrocarbon fuel can be extended to provide methods having three or more stages.

ILLUSTRATIVE EXAMPLE

Hot recycled vapor from the steam reforming reactor containing about 57 volume percent hydrogen and about 43 volume percent carbon dioxide and water, having a specific heat of about 0.6 Btu/lb°F. and having a temperature of about 700° F. was mixed with heavy naphtha (400° F. end boiling point). The vapor was mixed with liquid naphtha in a weight ratio of vapor to naphtha of 1:0.6 and provided a first vapor product containing vaporized naphtha and having a temperature of about 400° F. The first vapor product was introduced into a heat exchanger which used a low temperature energy source, that is, a vapor containing about 57 volume percent hydrogen, 43 volume percent carbon dioxide and water, having a specific heat of about 0.6 Btu/lb°F. and having a temperature of about 900° F. The temperature of the first vapor product was elevated by the heat exchanger to about 800° F. The first vapor product was mixed with additional liquid hydrocarbon fuel in a weight ratio of vapor to naphtha of 1:0.3 to provide a second vapor product which was delivered to the desulfurizer and eventually to the steam reforming reactor.

While preferred embodiments have been shown and described, various modifications and substitutions may be made thereto without departing from the spirit and scope of the invention. Accordingly, it will be understood that the present invention has been described by way of illustration and not limitation.

What is claimed is:

1. In a method for producing a hydrogen rich gas utilizing the vaporization of a liquid hydrocarbon fuel, the improvement comprising the steps of:
   dividing a liquid hydrocarbon fuel into at least two portions;
   staged vaporization of said fuel portions, said staged vaporization including:

a first stage wherein a first portion of the liquid hydrocarbon fuel is mixed with a heated vapor having a specific heat in the range of about 0.2 to 1 Btu/lb°F., said vapor having a sufficient temperature and heat transfer capability to cause vaporization of essentially all of the first fuel portion to provide a first vapor product;

heating said first vapor product; and successive stages of mixing and heating to vaporize essentially all of the remaining portions of liquid fuel to provide a final vapor product, the successive stages mixing the vapor product from a preceding stage with a portion of the liquid fuel; and reacting the final vapor product in a reforming zone to produce a hydrogen rich gas.

2. A method according to claim 1 wherein the temperature of the heated vapor employed to provide the first vapor product is between about 300° F. and about 900° F.

3. A method according to claim 2 wherein said first vapor product is heated to a temperature between 300° F. and about 900° F. prior to being mixed with a second portion of the liquid hydrocarbon fuel.

4. A method according to claim 3 wherein the liquid hydrocarbon fuel is mixed with the heated vapor in a weight ratio of fuel to vapor from about 0.1 to about 1 in said first stage.

5. A method according to claim 4 wherein the portions of liquid hydrocarbon fuel are mixed with the heated vapor products in the successive stages in a weight ratio of fuel to vapor product from about 0.1 to about 0.5.

6. A method according to claim 1 wherein said liquid hydrocarbon fuel is naphtha having an end boiling point between about 200° F. and 400° F. and said heated vapor comprises at least 50 volume percent hydrogen.

7. A method for the vaporization of liquid hydrocarbon fuels comprising the steps of:

dividing a liquid hydrocarbon fuel into at least two portions;

staged vaporization of said fuel portions, said staged vaporization including:

a first stage wherein a first portion of a liquid hydrocarbon fuel is mixed with a heated vapor having a specific heat in the range of about 0.2 to 1 Btu/lb°F., said vapor having a sufficient temperature and heat transfer capability to cause vaporization of essentially all of the first fuel portion to provide a first product;

heating said first vapor product in a heat exchanger to a temperature of between about 300° F. and 900° F. by the use of an energy source having relatively low energy content; and successive stages of mixing and heating to vaporize essentially all of the remaining portions of liquid fuel to provide a final vapor product, the successive stages mixing the heated vapor product from an immediately preceding stage with a portion of the liquid fuel; and further processing the final vapor product.

8. A method according to claim 7 wherein the temperature of said heated vapor is between about 300° F. and about 900° F.

9. A method according to claim 8 wherein the first portion of liquid hydrocarbon fuel is mixed with said heated vapor in a weight ratio range of fuel to vapor from about 0.1 to about 1.

10. A method according to claim 9 wherein a second portion of liquid hydrocarbon fuel is mixed with said first vapor product in a weight ratio range of fuel to first vapor product from about 0.1 to about 0.5 in a second stage.

11. A method according to claim 10 wherein the heat exchangers which heat the vapor products at the successive stages use an energy source which is a vapor having a temperature below about 1000° F. and having a specific heat in the range of about 0.2 to about 1 BTU/lb.°F.

12. A method according to claim 11 further comprising the steps of:

receiving from a vapor source a vapor having a temperature between about 200° F. and about 600° F.: and heating said received vapor in a heat exchanger to a temperature between about 300° F. and 900° F. to produce said heated vapor for said first stage, said heat exchanger employing an energy source having a relatively low energy content.

13. A method according to claim 12 wherein the heat exchanger which provides the heated vapor for said first stage uses an energy source which is a vapor having a temperature below about 1000° F. and having a specific heat in the range of about 0.2 to about 1 Btu/lb.°F.

14. A method according to claim 13 wherein said liquid hydrocarbon fuel is naptha having an end boiling point between about 200° and 400° F. and wherein the vapor delivered to the heat exchanger to provide the heated vapor for said first stage comprises at least about 50 volume percent hydrogen.

15. The method of claim 7 wherein the step of further processing comprises:

reacting the final vapor product in a reforming zone to produce a hydrogen rich gas.

16. The method of claim 7 wherein the step of further processing comprises:

desulphurizing the final vapor product.

17. A method for causing the vaporization of a predetermined amount of liquid hydrocarbon fuel comprising the steps of:

dividing a liquid hydrocarbon fuel into at least two portions;

staged vaporization of said fuel portions, said staged vaporization including:

a first stage wherein a first portion of the liquid hydrocarbon fuel is mixed with a heated vapor having a specific heat in the range of about 0.2 to BTU/lb.°F., said vapor having a sufficient temperature and heat transfer capability to cause vaporization of essentially all of the first fuel portions to provide a first vapor product;

heating said first vapor product; and successive stages of mixing and heating to vaporize essentially all of the remaining portions of liquid fuel to provide a final vapor product, the successive stages mixing the heated vapor product from an immediately preceding stage with a portion of the liquid fuel; and passing said final vapor product through a desulphurizer.

* * * * *